(No Model.) 2 Sheets—Sheet 2.
G. W. ETTENGER.
BRAKE BEAM.
No. 515,666. Patented Feb. 27, 1894.
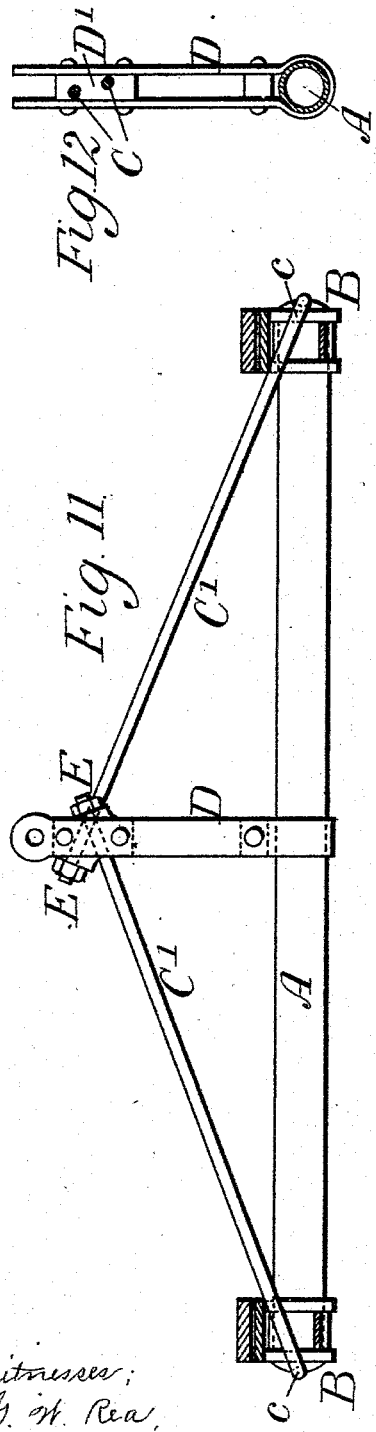
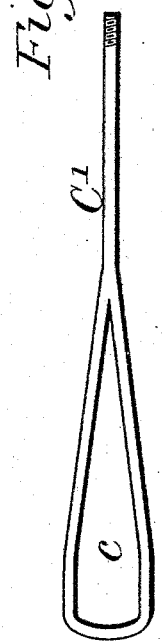
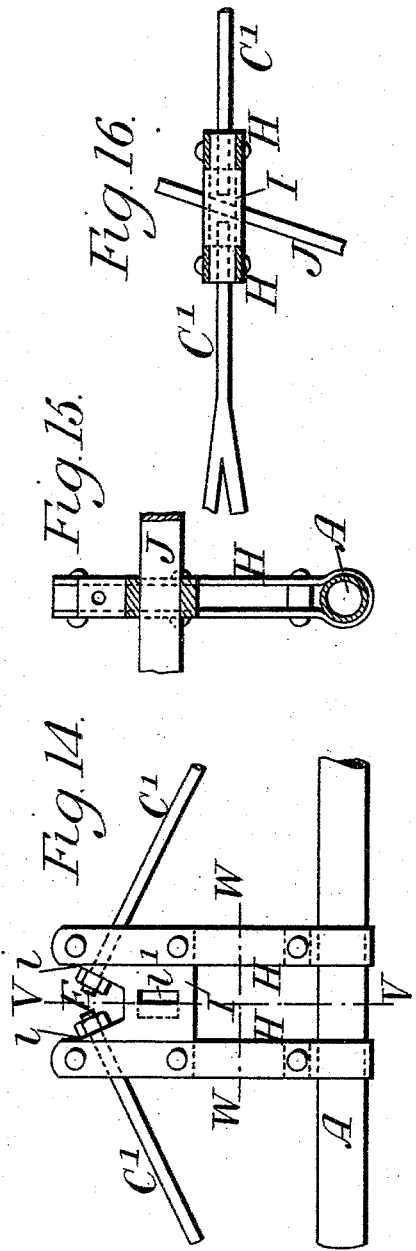
Witnesses:
G. W. Rea
Jno. B. Hopper
Inventor:
George W. Ettenger,
By James L. Norris
Atty.
THE NATIONAL LITHOGRAPHING COMPANY,
WASHINGTON, D. C.

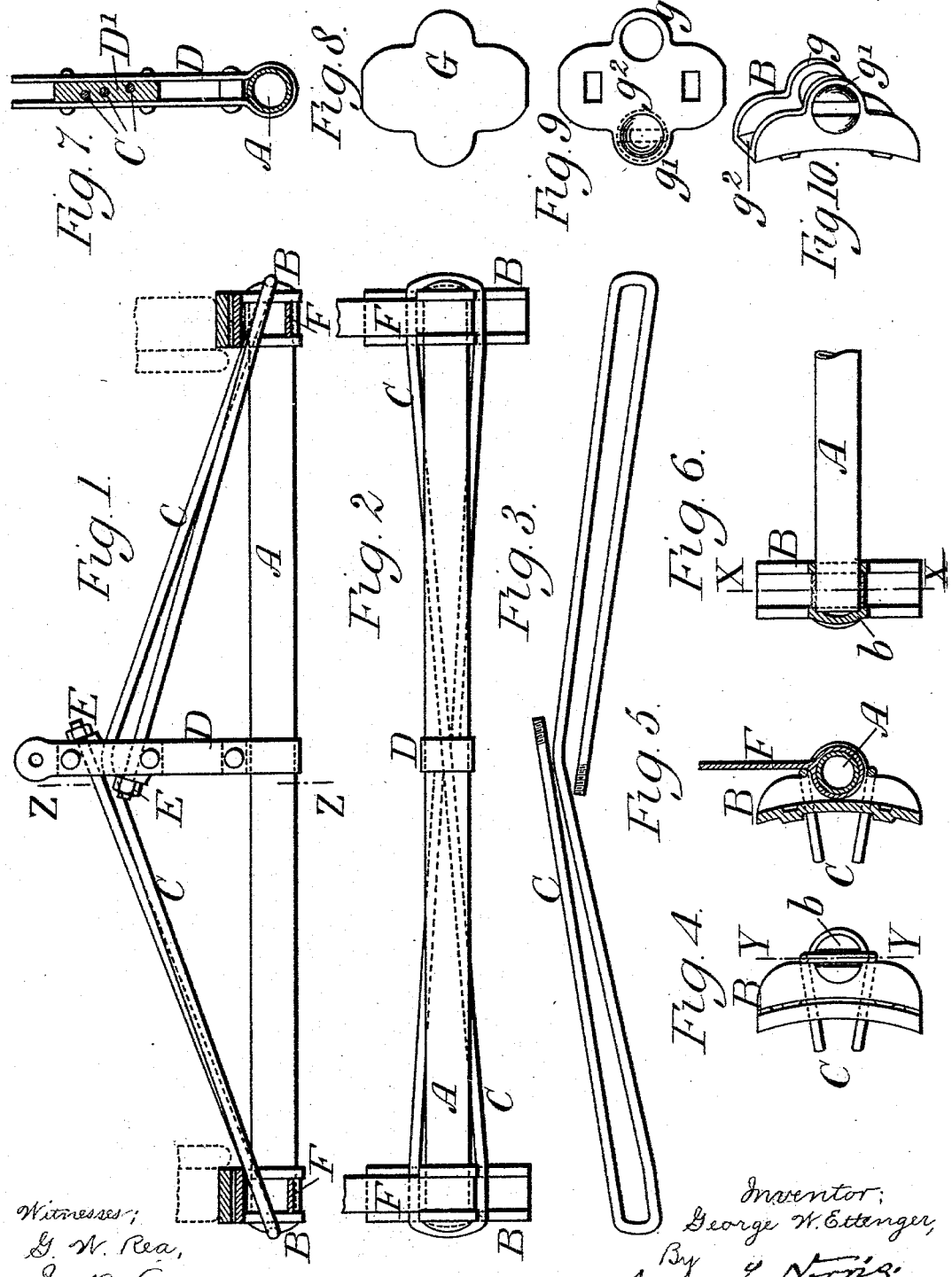

UNITED STATES PATENT OFFICE.

GEORGE WATSON ETTENGER, OF BARROW-IN-FURNESS, ASSIGNOR OF ONE-HALF TO GEORGE EARL CHURCH, OF LONDON, ENGLAND.

BRAKE-BEAM.

SPECIFICATION forming part of Letters Patent No. 515,666, dated February 27, 1894.

Application filed November 6, 1893. Serial No. 490,144. (No model.)

*To all whom it may concern:*

Be it known that I, GEORGE WATSON ETTENGER, a citizen of the United States, residing at 12 Church Street, Barrow-in-Furness, Lancashire, England, have invented certain new and useful Improvements in Brake Apparatus for Railway Wagons and Carriages, of which the following is a specification.

This invention relates to that description of brake apparatus wherein the brake blocks are applied to two or more wheels on opposite sides of the vehicles the two opposite brake blocks being connected to the ends of a trussed transverse beam suspended from the under frame or from the bogie frames or other part of the vehicle.

My present invention has for its objects to simplify, strengthen, and at the same time cheapen the construction of such brake beams and their shoes, first by considerably lessening the number of parts of which they are composed, secondly by doing away with projecting lugs for attachment of the the truss rods, which are liable to fracture, and which require special castings or forgings that are difficult to renew and thirdly, by making the brake shoes by preference of stamped sheet metal instead of steel or other castings; the general construction of the brake beam is however also applicable to other kinds of brake-shoes.

According to my present invention the transverse beam is preferably constructed of a metal tube, although it can also be made of any other section of metal that may be desired, such as an angle, T, or channel in cross section, or it may be a solid bar of rectangular or other shaped section. The brake heads or shoes are fitted directly on to the ends of the beam and are securely held thereon by simply passing round the outer side thereof a loop of the truss rod that is carried to the king or queen post, and is there tightened up by means of screw nuts. By this arrangement I dispense with the separate caps that have heretofore been fitted on to the ends of the brake beam for the reception of the brake shoes and which have the screw attachments both for the shoes and for the truss rods.

I will proceed to describe the construction of the said improved brake beam in connection with the accompanying drawings, in which—

Figure 1 shows a plan of the beam; Fig. 2 a front view. Fig. 3 shows a perspective view of the looped truss rod detached. Fig. 4 shows an end view; Figs. 5 and 6 sections taken respectively on lines X, X, and Y Y; Fig. 7 a section at Z Z Fig. 1. Fig. 8 is a plan view of a blank of a brake shoe; Figs. 9 and 10 views of the shoe in successive stages of manufacture; Fig. 11 a plan of a brake beam with a modified form of the truss rod; Fig. 12 a cross section; Fig. 13 a view of one of the looped truss rods detached. Fig. 14 shows a part plan, and Figs. 15 and 16 are sections respectively on lines V V and W W of a construction with queen posts.

The beam A is shown as constructed of a metal tube; it may however be of a different section as above described. On the ends of the beam are fitted directly the brake shoes B B, which may be of any construction having a circular opening on the inner side through which the end of the beam passes, while within it is formed a socket, recess, or shoulder serving as abutment for the end of the tube. On the outer face of the brake shoe is formed a rounded surface or boss *b* having a groove in which is laid a loop of the truss rod C. This rod in the arrangement at Figs. 1 to 6 is bent into the form of a double loop, as shown more clearly at Fig. 3, each loop being passed round one of the brake shoes as described while the middle part and the two ends are passed through corresponding holes formed in the distance piece D' of the king post D, this being formed of a metal band bent round the middle of the brake beam and having its two limbs secured together by rivets with distance pieces as shown. The distance piece D' is formed with inclined faces at right angles to the two ends of the truss rod passing through the holes, and the said ends being formed with screw threads, nuts E are screwed thereon whereby the two loops are tightened up so as to draw the brake shoes B tightly on to the ends of the brake beam, and to hold them securely in that position without any other fastening. The hangers F fit with eyes over the ends of the brake beam A in the hollow space between the cheeks of the shoes, these spaces being open at top for the passage of the hanger strap, as shown.

In the modification shown at Figs. 11, 12 and 13 the truss rod is made of two separate parts C' C', each of which has a forged loop c which embraces the shoe as with the first described arrangement, and through which the beam A is passed, the screwed end of each rod being passed through the distance piece of the king post and tightened up by a nut E, as before.

By constructing the king post D of a bent sheet metal band as described, instead of a casting, such as has been employed heretofore I am enabled readily and cheaply to replace the same on the spot in the case of injury or fracture, instead of requiring to wait till duplicate castings have been obtained from the special factory which may be situated a long distance away.

The brake shoes may, as previously stated, be of any construction that will permit of the brake beam being passed into it and allow of its being held on by a looped truss rod; I prefer however to make the shoes out of stamped and punched sheet metal in place of a casting as heretofore. For this purpose I first produce a blank of the configuration shown at G, Fig. 8, by stamping or otherwise out of a piece of sheet metal; on this blank is formed either simultaneously or by a subsequent stamping and punching operation, a hole $g$ on the one lappet corresponding to the inner side cheek, and an embossed part $g'$ on the other lappet, corresponding to the outer side cheek, after which the blank is brought by a further stamping or forging in a die, into the shape shown at Fig. 10 with the two lappets $g$ $g'$ bent up to form the side cheeks, and the part $g^2$ bent to the requisite curvature for the reception of the separate metal brake block.

Figs. 14, 15 and 16 show respectively a part plan and sections on lines V V and W W of a modified construction in which the beam A is provided with two queen posts H H connected to each other by a distance piece I, formed with holes for the passage of the ends of the looped truss rods C' C', and inclined faces $i$ $i$ for the nuts E to bear against, and it also has an oblique slot $i'$ formed in it for the passage of the inclined brake lever J, such as is frequently used for actuating the brake beams. This arrangement with queen posts also admits of the use of the beam on broad gage lines without materially increasing the weight of metal used in making the beam.

Having thus described the nature of my invention and the best means I know for carrying the same into practical effect, I claim—

1. In brake apparatus for railway carriages and wagons, the combination of a brake beam, brake shoes fitted onto the ends of such beam, and a looped truss rod or rods passing round the outer sides of the brake shoes and secured by screw nuts to a king or queen post on the brake beam, so as to draw the shoes tightly onto the ends of the beam, substantially as described.

2. In brake apparatus for railway carriages and wagons, the combination of a brake beam, brake shoes fitting with two side cheeks on to the ends of such beam, a looped truss rod or rods passing round the outer side cheeks of the brake shoes and secured by screw nuts to a king or queen post, on the brake beam, and hangers fitted with eyes on to the ends of the brake beams within the space between the side cheeks of the brake shoes, substantially as described.

3. In brake apparatus for railway carriages and wagons, the combination of a brake beam, brake shoes adapted to be fitted on to the ends of said beam and formed of sheet metal stamped or pressed and punched in dies so as to form two side cheeks on a middle part adapted to receive a separate brake block, a hole being punched in the one side cheek for the passage of the beam and a recess formed on the inner side of the other side cheek to form an abutment for the end of the beam, said shoe being secured on the beam by a looped truss rod adjustably secured to a king or queen post on the beam, substantially as described.

4. In brake apparatus for railway carriages and wagons, the combination of a brake beam, brake shoes adapted to be fitted on to the ends of said beam, a king post formed of a sheet metal band bent at its middle to form a loop embracing the brake beam and having its two limbs secured together by distance pieces and rivets or other fastenings, and a looped truss rod or rods passing round the outer cheeks of the brake shoes, and secured by screw nuts to the king post, substantially as described.

5. In brake apparatus for railway carriages and wagons, a brake shoe formed of sheet metal by stamping or pressing and punching in dies, said brake shoe having one side cheek formed with a hole for a brake beam to pass through, and a second side cheek recessed on the inner side to form an abutment socket for the end of the brake beam to bear against, the outer surface of such cheek being rounded for receiving the loop of the truss rod, substantially as described.

6. In a trussed brake beam for railway carriages and wagons, a king or queen post or strut, consisting of a sheet metal band bent at its middle to form a loop embracing the brake beam and having its two limbs secured together by distance pieces and rivets or other fastenings, said distance pieces having holes formed transversely through them and inclined surfaces for the reception of the truss rod or rods and screw nuts, substantially as described.

In testimony whereof I have signed my name to this specification, in the presence of two subscribing witnesses, this 23d day of October, A. D. 1893.

GEORGE WATSON ETTENGER.

Witnesses:
CHAS. D. ABEL,
*Chartered Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*